US011165606B2

(12) United States Patent
Liu et al.

(10) Patent No.: US 11,165,606 B2
(45) Date of Patent: Nov. 2, 2021

(54) METHOD AND APPARATUS FOR SENDING DEMODULATION REFERENCE SIGNAL, AND DEMODULATION METHOD AND APPARATUS

(71) Applicant: Huawei Technologies Co., Ltd., Shenzhen (CN)

(72) Inventors: Yong Liu, Shanghai (CN); Xiang Ren, Shanghai (CN); Lu Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 67 days.

(21) Appl. No.: 16/676,906

(22) Filed: Nov. 7, 2019

(65) Prior Publication Data

US 2020/0076649 A1 Mar. 5, 2020

Related U.S. Application Data

(63) Continuation of application No. PCT/CN2018/089992, filed on Jun. 5, 2018.

(30) Foreign Application Priority Data

Jun. 16, 2017 (CN) .......................... 201710459720.8

(51) Int. Cl.
*H04W 72/04* (2009.01)
*H04L 25/02* (2006.01)
(Continued)

(52) U.S. Cl.
CPC ........ *H04L 25/0224* (2013.01); *H04L 5/0048* (2013.01); *H04L 27/2613* (2013.01); *H04W 72/0446* (2013.01); *H04L 5/0005* (2013.01)

(58) Field of Classification Search
CPC . H04W 4/005; H04W 72/04; H04W 72/0446; H04L 25/0224; H04L 5/0048; H04L 5/0005; H04L 27/2613
See application file for complete search history.

(56) References Cited

U.S. PATENT DOCUMENTS

2013/0294318 A1* 11/2013 Amerga ................. H04W 4/06
370/312
2016/0087774 A1 3/2016 Guo et al.
(Continued)

FOREIGN PATENT DOCUMENTS

CN 102088434 A 6/2011
CN 102869096 A 1/2013
(Continued)

OTHER PUBLICATIONS

3rd Generation Partnership Project; Technical Specification Group Radio Access Network; Evolved Universal Terrestrial Radio Access (E-UTRA); Physical layer procedures (Release 14), 3GPP TS 36.213 V14.2.0 (Mar. 2017), 454 pages.
(Continued)

*Primary Examiner* — Wei Zhao
(74) *Attorney, Agent, or Firm* — Slater Matsil, LLP (57) ABSTRACT

Embodiments of this application disclose a method and apparatus for sending a demodulation reference signal, and a demodulation method and apparatus, and relate to the field of communications technologies. The method for sending a demodulation reference signal may include: generating a demodulation reference signal, where a sequence length of the demodulation reference signal is related to an attribute of the demodulation reference signal; and sending the demodulation reference signal.

17 Claims, 4 Drawing Sheets

(51) Int. Cl.
*H04L 5/00* (2006.01)
*H04L 27/26* (2006.01)

(56) References Cited

U.S. PATENT DOCUMENTS

2017/0171690 A1* 6/2017 Kim .................. H04L 51/02
2017/0201362 A1* 7/2017 Park .................. H04L 5/0048
2017/0288835 A1 10/2017 Kim et al.

FOREIGN PATENT DOCUMENTS

| | | |
|---|---|---|
| CN | 103944665 A | 7/2014 |
| CN | 104125186 A | 10/2014 |
| WO | 2016048074 A1 | 3/2016 |

OTHER PUBLICATIONS

LG Electronics, "DL DMRS Design," 3GPP TSG RAN WG1 Meeting #88, R1-1702461, Athens, Greece, Feb. 13-17, 10 pages.
Spreadtrum Communications, "Considerations on DMRS for CP-OFDM," 3GPP TSG RAN WG1 Meeting #89, R1-1707784, Hangzhou, China, May 15-29, 2017, 6 pages.
Huawei et al., "Design of DL DMRS for data transmission," 3GPP TSG RAN-WG1 Meeting #89, R1-1706933, Hangzhou, China, May 15-19, 2017, 6 pages.
ZTE, "Discussion on downlink DMRS design," 3GPP TSG-RAN WG1 Meeting 89, R1-1707130, Hangzhou, China, May 15-19, 2017, 12 pages.

* cited by examiner

METHOD AND APPARATUS FOR SENDING DEMODULATION REFERENCE SIGNAL, AND DEMODULATION METHOD AND APPARATUS

CROSS-REFERENCE TO RELATED APPLICATIONS

This application is a continuation of International Application No. PCT/CN2018/089992, filed on Jun. 5, 2018, which claims priority to Chinese Patent Application No. 201710459720.8, filed on Jun. 16, 2017. The disclosures of the aforementioned applications are hereby incorporated by reference in their entireties.

TECHNICAL FIELD

This application relates to the field of communications technologies, and in particular, to a method and an apparatus for sending a demodulation reference signal, and a demodulation method and apparatus.

BACKGROUND

There are diversified transmission requirements in a 5G communications system, for example, coexistence of high and low frequencies and multiple numerologies. Currently, the 5G communications system is in a research and development design phase. So far, a related design of a sequence of a demodulation reference signal (DMRS) has not been determined yet.

SUMMARY

This application provides a method and an apparatus for sending a demodulation reference signal, and a demodulation method and apparatus. Specifically, a related design of a sequence of a demodulation reference signal is provided.

According to a first aspect, this application provides a method for sending a demodulation reference signal. The method may be performed by a transmit end device. In an uplink transmission scenario, the transmit end device may be a terminal. In a downlink transmission scenario, the transmit end device may be a base station. The method may include: generating a demodulation reference signal, where a sequence length of the demodulation reference signal is related to an attribute of the demodulation reference signal; and sending the demodulation reference signal. In the technical solution, the sequence length of the demodulation reference signal is related to the attribute of the demodulation reference signal. Optionally, the demodulation reference signal may be, for example, but is not limited to at least one of the following: a pattern corresponding to the demodulation reference signal, density of the demodulation reference signal, and the like. Therefore, the technical solution is applicable to a scenario in which density of a demodulation reference signal can be configured and/or a pattern corresponding to the DMRS can be configured. Therefore, the technical solution is applicable to a 5G communications system.

According to a second aspect, this application provides a demodulation method. The method may be performed by a receive end device. In an uplink transmission scenario, the receive end device may be a base station. In a downlink transmission scenario, the receive end device may be a terminal. The method may include: receiving a demodulation reference signal, where a sequence length of the demodulation reference signal is related to an attribute of the demodulation reference signal; and demodulating a data signal based on the demodulation reference signal. Optionally, the demodulation reference signal may be, for example, but is not limited to at least one of the following: a pattern corresponding to the demodulation reference signal, density of the demodulation reference signal, and the like.

Based on the first aspect or the second aspect, in a possible design, a sequence of the demodulation reference signal includes K same basic sequences, and each basic sequence is corresponding to one time-frequency resource that carries the demodulation reference signal, and K is an integer greater than or equal to 2. Optionally, each time-frequency resource includes one of the following: one or more symbols, one or more slots, and one or more subframes in time domain. Optionally, K time-frequency resources include one preamble resource and K−1 additional resources. The preamble resource may be understood as a time-frequency resource that carries the demodulation reference signal and that is a preamble symbol in time domain. The additional resource is a time-frequency resource that carries the demodulation reference signal other than the preamble resource.

Based on the first aspect or the second aspect, in a possible design, when the method is performed by the base station, the method may include: sending indication information, where the indication information is used to indicate a length of the basic sequence. Then, after receiving the indication information, the terminal may generate the sequence of the demodulation reference signal based on the indication information.

Based on the first aspect or the second aspect, in a possible design, when the method is performed by the terminal, the method may include: receiving indication information, where the indication information is used to indicate a length of the basic sequence. Then, the terminal may generate the sequence of the demodulation reference signal based on the indication information.

A technical solution in which the length of the basic sequence is indicated using the indication information is provided above, and this application is not limited thereto. For example, a receiving party and a sending party may pre-agree on the length of the basic sequence. In addition, the indication information may include, for example, but is not limited to at least one of the following: the length of the basic sequence, a length index of the basic sequence, a value of N, and the like.

According to a third aspect, this application provides an apparatus for sending a demodulation reference signal, and the apparatus can implement the method for sending a demodulation reference signal according to the first aspect. For example, the apparatus may be a transmit end device (for example, a base station or a terminal), and the apparatus may implement the foregoing method by using software or hardware or by using hardware executing corresponding software.

In a possible design, the apparatus may include a processor and a memory. The processor is configured to support the apparatus in executing a corresponding function in the method according to the first aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

In a possible design, the apparatus may include a processing unit and a transceiver unit. The processing unit is configured to generate a demodulation reference signal, where a sequence length of the demodulation reference signal is related to an attribute of the demodulation reference signal. The transceiver unit is configured to send the demodulation reference signal.

According to a fourth aspect, this application provides a demodulation apparatus, and the apparatus can implement the demodulation method according to the second aspect. For example, the apparatus may be a receive end device (for example, a base station or a terminal), and the apparatus may implement the foregoing method by using software or hardware or by using hardware executing corresponding software.

In a possible design, the apparatus may include a processor and a memory. The processor is configured to support the apparatus in executing a corresponding function in the method according to the second aspect. The memory is configured to be coupled to the processor and stores a program (instruction) and data that are necessary for the apparatus. In addition, the apparatus may further include a communications interface, configured to support communication between the apparatus and another network element. The communications interface may be a transceiver.

In a possible design, the apparatus may include a processing unit and a transceiver unit. The transceiver unit is configured to receive a demodulation reference signal, where a sequence length of the demodulation reference signal is related to an attribute of the demodulation reference signal. The processing unit is configured to demodulate a data signal based on the demodulation reference signal.

Based on the third aspect or the fourth aspect, in a possible design, a sequence of the demodulation reference signal includes K same basic sequences, and each basic sequence is corresponding to one time-frequency resource that carries the demodulation reference signal, and K is an integer greater than or equal to 2. Optionally, each time-frequency resource includes one of the following: one or more symbols, one or more slots, and one or more subframes in time domain. Optionally, K time-frequency resources include one preamble resource and K−1 additional resources. The preamble resource may alternatively be understood as a time-frequency resource that carries the demodulation reference signal and that is a preamble symbol in time domain. The additional resource is a time-frequency resource that carries the demodulation reference signal other than the preamble resource.

In a possible design, when the apparatus is the base station, the transceiver unit may be further configured to send indication information, where the indication information is used to indicate a length of the basic sequence. Then, after receiving the indication information, the terminal may generate the sequence of the demodulation reference signal based on the indication information.

In a possible design, when the apparatus is the terminal, the transceiver unit may be further configured to receive indication information, where the indication information is used to indicate a length of the basic sequence. Then, the terminal may generate the sequence of the demodulation reference signal based on the indication information.

This application further provides a computer storage medium, where the computer storage medium stores a computer program (instruction). When the program (instruction) runs on a computer, the computer performs the method according to any one of the foregoing aspects.

This application further provides a computer program product. When the computer program product runs on a computer, the computer performs the method according to any one of the foregoing aspects.

It may be understood that, any apparatus, computer storage medium, or computer program product provided above is configured to perform the corresponding methods provided above. Therefore, for beneficial effects that can be achieved by the apparatus, computer storage medium, or computer program product, refer to beneficial effects of the corresponding methods. Details are not described herein again.

DETAILED DESCRIPTION OF ILLUSTRATIVE EMBODIMENTS

In a long term evolution (LTE) system, a demodulation reference signal (DMRS) is in a one-to-one correspondence with a port (namely, an antenna port). In addition, the DMRS has fixed density, and a sequence length of a DMRS corresponding to a fixed port number is fixed. For example, a sequence length of a DMRS corresponding to a port 5 is 12*X. To be specific, in a resource block (RB), a quantity of resource elements (RE) that carry the DMRS corresponding to the port 5 is 12. Herein, X is a quantity of RBs that carry the DMRS corresponding to the port 5 in full bandwidth.

There are diversified transmission requirements in a 5G communications system, for example, coexistence of high and low frequencies and multiple numerologies. Therefore, configurable density of a DMRS and a configurable pattern corresponding to the DMRS are agreed in the RAN1#89 meeting. As a result, "a sequence length of a DMRS corresponding to a fixed port number is fixed" defined in LTE is not applicable to the 5G communications system.

Based on this, this application provides a method and an apparatus for sending a demodulation reference signal, and a demodulation method and apparatus. Technical solutions provided in this application may be applied to various communications systems for transmitting a demodulation reference signal, for example, an existing communications system, the 5G communications system, a future evolved system, or a converged system of a plurality of communications system. A plurality of application scenarios may be included, for example, a machine to machine (M2M) scenario, a D2M scenario, a macro-micro communication scenario, an enhanced mobile Internet (eMBB) scenario, an ultra-reliable and low latency communications (uRLLC) scenario, and a massive machine type communication (mMTC) scenario. These scenarios may include but are not limited to a communication scenario between terminals, a communication scenario between base stations, a communication scenario between a base station and a terminal, and the like. Alternatively, the technical solutions provided in this application may be applied to a communication scenario between terminals, a communication scenario between base stations, or the like in the 5G communications system.

Figure 1:
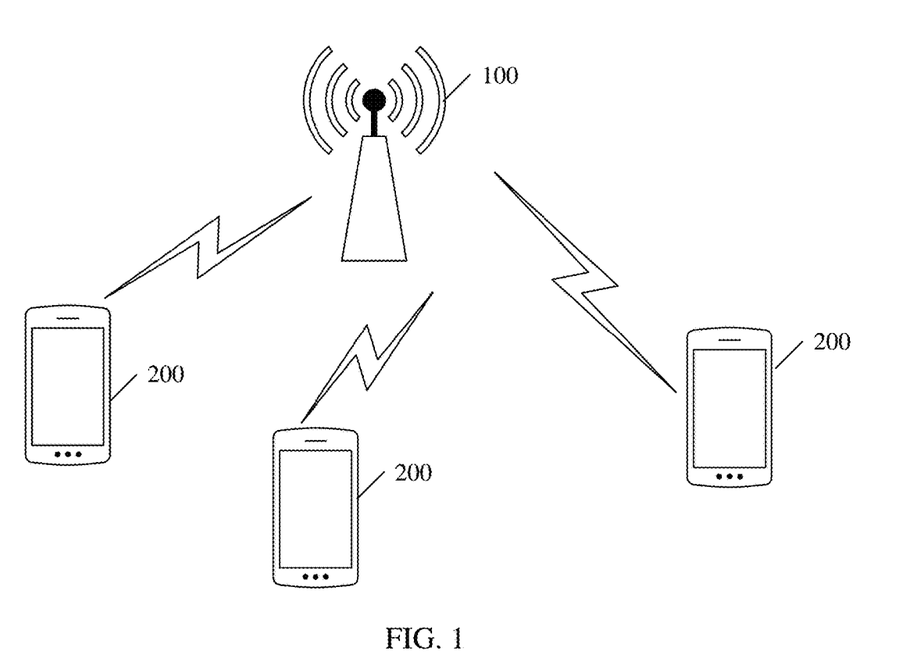
FIG. 1 is a schematic diagram of a communications system applicable to a technical solution according to an embodiment of this application.

FIG. 1 is a schematic diagram of a communications system. The communications system may include at least one base station 100 (only one base station 100 is shown) and one or more terminals 200 connected to the base station 100.

The base station 100 may be a device that can communicate with the terminal 200. The base station 100 may be a relay station, an access point, or the like. The base station 100 may be a base transceiver station (BTS) in a global system for mobile communications (GSM) or a code division multiple access (CDMA) network, or may be an NB (NodeB) in wideband code division multiple access (WCDMA), or may be an eNB or an eNodeB (evolutional NodeB) in LTE. Alternatively, the base station 100 may be a radio controller in a cloud radio access network (CRAN) scenario. The base station 100 may be further a network device in a 5G network or a network device in a future evolved network, or may be further a wearable device, a vehicle-mounted device, or the like.

The terminal 200 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a future 5G network, or a terminal in a future evolved PLMN network.

A demodulation reference signal is a reference signal on which a receiving party and a sending party pre-agree and that is used to assist in demodulation of a data signal. The demodulation reference signal in this application may be, for example, but is not limited to a DMRS or a cell-specific reference signal (CRS). The demodulation reference signal is sent on a scheduled resource unit, and a quantity of resource units scheduled at a time is not limited in this application. A resource unit may be used as a basic unit for scheduling a terminal to perform resource allocation, or may be used to describe an arrangement manner of a plurality of reference signals, or the like. The resource unit may include a plurality of contiguous subcarriers in frequency domain and a fixed quantity of time intervals (TI) in time domain. The TI may be a transmission time interval (TTI) in an LTE system, or may be a symbol-level short TTI or a short TTI that has a large subcarrier spacing and that is in a high frequency system, or may be a slot or a mini-slot in a 5G system. Optionally, one resource unit may include but is not limited to any one of the following: one or more RBs, one or more RB pairs, one or more RB groups (RBG), or the like. In addition, the resource unit may be further half an RB, or another time-frequency resource. This is not limited in this application. The RB pair is two adjacent RBs in time domain. The RBG is a time-frequency resource that includes one TI in time domain and one or more contiguous RBs in frequency domain. The following performs description by using an example in which one resource unit is one RB pair, and the RB pair includes 12 contiguous subcarriers (numbered 0 to 11) in frequency domain and 14 symbols (numbered 0 to 13) in time domain.

A quantity of demodulation reference signals sent by a transmit end device is related to a quantity of data streams (namely, a quantity of layers), and the demodulation reference signals are in a one-to-one correspondence with antenna ports. An antenna port is a logical concept and is different from a physical port, and the antenna port is related to the physical port through layer mapping and precoding. For a related process, refer to the prior art. Details are not described in this specification. Unless otherwise specified, a "port" described in this application is a logical antenna port. It may be understood that, in one scheduling period (namely, one TI), scheduled ports may be some or all of ports supported by a system. In different scheduling periods, a same port or different ports may be scheduled. In one scheduling period, demodulation reference signals corresponding to the scheduled ports may have same or different density. In different scheduling periods, demodulation reference signals corresponding to the same scheduled port may have same or different density and/or may correspond to a same pattern or different patterns. A quantity of ports supported by the system for transmitting the demodulation reference signals is not limited in this application, for example, but not limited to two, four, six, eight, or twelve ports supported in transmission of the demodulation reference signals. In addition, the system can simultaneously support various quantities of ports for transmitting demodulation reference signals. For example, the system can simultaneously support eight ports in transmission of demodulation reference signals and support twelve ports in transmission of demodulation reference signals.

The demodulation reference signal on which the receiving party and the sending party pre-agree is usually a modulation symbol sequence, and the symbol sequence is "a sequence of the demodulation reference signal". A modulation method of the demodulation reference signal may be, for example, but is not limited to any one of the following: binary phase shift keying (BPSK), quadrature phase shift keying (QPSK), 16 quadrature amplitude modulation (QAM), or the like. The sequence of the demodulation reference signal includes one or more modulation symbols. For example, if the modulation method is BPSK, the modulation symbol is a BPSK symbol. If the modulation method is QPSK, the modulation symbol is a QPSK symbol. In different modulation methods, the sequence of the demodulation reference signal is generated by using different generation formulas. The following performs description by using an example in which the modulation method is QPSK.

The term "a plurality of" in this specification means two or more than two. The terms "first", "second", and the like in this specification are merely intended to distinguish between different objects, and do not limit their sequences. For example, first indication information and second indication information are merely used to distinguish between different indication information, and do not limit sequences of the first indication information and the second indication information. The term "and/or" in this specification describes only an association relationship for describing associated objects and represents that three relationships may exist. For example, A and/or B may represent the following three cases: only A exists, both A and B exist, and only B exists. In addition, the character "/" in this specification generally represents an "or" relationship between the associated objects, and the character "/" in a formula represents a "division" relationship between the associated objects.

The technical solutions provided in this application may be applied to an uplink transmission scenario, or may be applied to a downlink transmission scenario. In the uplink transmission scenario, a transmit end device is a terminal, and a receive end device is a base station. In the downlink transmission scenario, the transmit end device is the base station, and the receive end device is the terminal.

Figure 2:
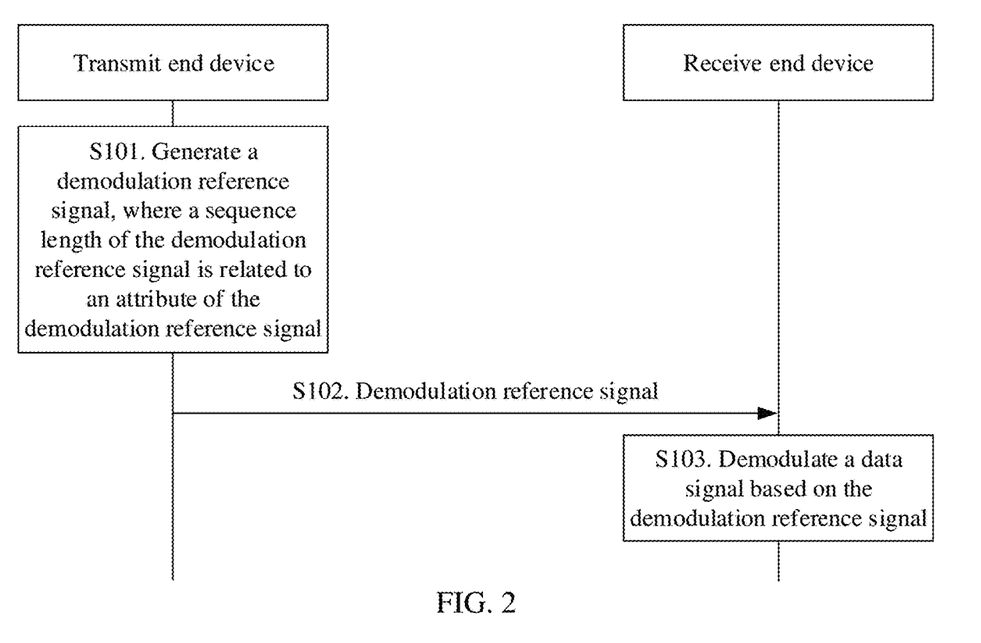
FIG. 2 is a schematic interaction diagram of a method for transmitting a demodulation reference signal according to an embodiment of this application.

FIG. 2 is a schematic flowchart of a method for transmitting a demodulation reference signal according to this application, where a method for sending a demodulation reference signal and a demodulation method are included. The method shown in FIG. 2 may include the following steps.

S101. A transmit end device generates a demodulation reference signal, where a sequence length of the demodulation reference signal is related to an attribute of the demodulation reference signal.

The demodulation reference signal may be a demodulation reference signal corresponding to any port supported by a system. The attribute of the demodulation reference signal is, for example, but is not limited to at least one of the following: a pattern corresponding to the demodulation reference signal, density of the demodulation reference signal, and the like. The density of the demodulation reference signal may include at least one of the following: time-frequency density of the demodulation reference signal, frequency domain density of the demodulation reference signal, and time domain density of the demodulation reference signal. In addition, the attribute of the demodulation reference signal may further include a transport mode of a terminal, an identifier of a cell in which the terminal is located, and the like. An implementation used by the transmit end device to obtain the attribute of the demodulation reference signal is not limited in this application. For example, reference may be made to the prior art.

Figure 3:
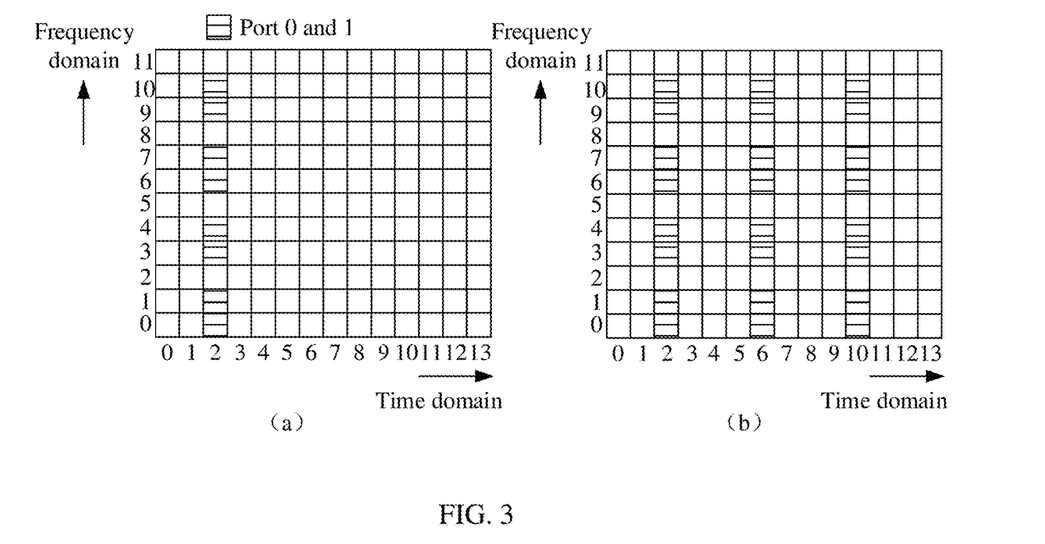
FIG. 3 is a pattern in which a system supports two ports in transmission of demodulation reference signals according to an embodiment of this application.
Figure 4:
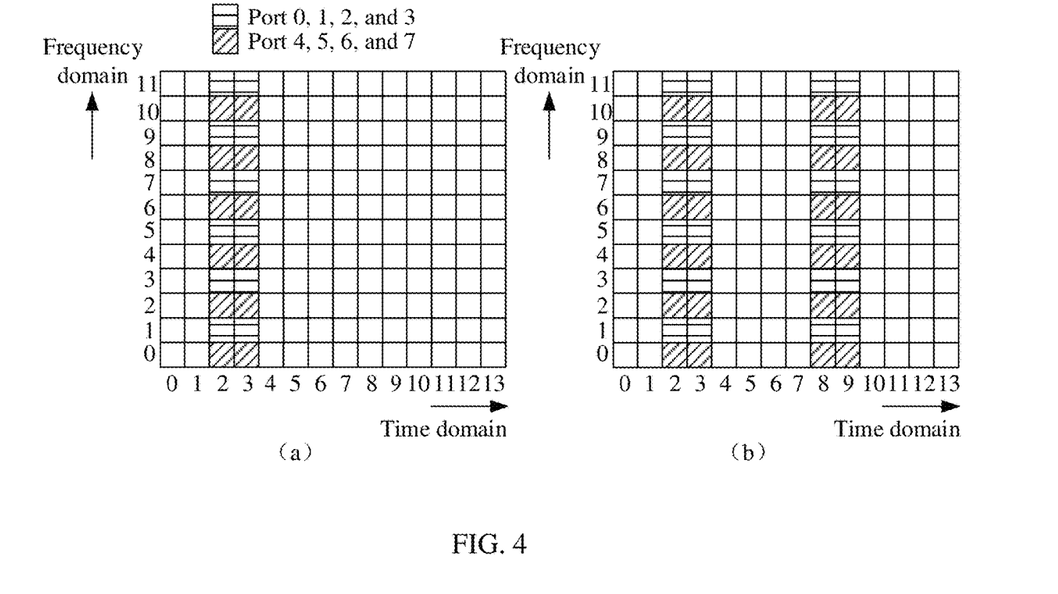
FIG. 4 is a pattern in which a system supports eight ports in transmission of demodulation reference signals according to an embodiment of this application.

FIG. 3 shows several patterns in which a system supports two ports in transmission of demodulation reference signals. FIG. 4 shows several patterns in which a system supports eight ports in transmission of demodulation reference signals. Each small grid in FIG. 3 and FIG. 4 represents one RE, and a small shadow grid is used to carry a demodulation reference signal. Information carried in small blank grids in FIG. 3 and FIG. 4 is not limited. Certainly, this application is not limited thereto.

The transmit end device and a receive end device may pre-agree on a modulation method of the demodulation reference signal based on a protocol or configure a modulation method of the demodulation reference signal through signaling. The transmit end device may obtain a sequence of the demodulation reference signal based on a generation formula of the sequence of the demodulation reference signal. For example, the modulation method is QPSK, the generation formula of the sequence of the demodulation reference signal may be as follows:

$$r(m) = \frac{1}{\sqrt{2}}(1 - c(2m)) + j\frac{1}{\sqrt{2}}(1 - 2c(2m-1)), \quad \text{Formula 1}$$

$$m = 1, 2 \ldots a*N$$

Herein, r(m) represents an $m^{th}$ modulation symbol in the sequence of the demodulation reference signal, a*N is the sequence length of the demodulation reference signal, a is a quantity of REs occupied by the demodulation reference signal in one resource unit, and N is a quantity of resource units that carry the demodulation reference signal in full bandwidth. Generally, the quantity of resource units that carry the demodulation reference signal is a quantity of resource units that are included in a physical downlink shared channel (PDSCH) allocated to the receive end device.

If the demodulation reference signal is a DMRS, an initial value of c(2m) is related to the transport mode (TM) of the terminal. For example, if the transport mode of the terminal is a TM 7, the initial value $c_{init}$ of c(2m) may be represented as: $c_{init} = (\lfloor n_s/2 \rfloor + 1)*(2N_{ID}^{cell} + 1)*2^{16} + n_{RNTI}$. Herein, $\lfloor \ \rfloor$ indicates rounding down, $n_s$ indicates a slot number, and $N_{ID}^{cell}$ indicates a cell identifier, where $n_{RNTI}$ is related to a radio network temporary identifier (RNIT) of the scheduled terminal. If the RNIT is not allocated to the terminal, $D_{RNTI}$ is 0. If the demodulation reference signal is a CRS, the initial value $c_{init}$ of c(2m) is related to the cell identifier.

For example, it is assumed that a quantity of resource units that carry a demodulation reference signal in full bandwidth is 20 (to be specific, N=20). Therefore, if the demodulation reference signal is any demodulation reference signal shown in FIG. 3(a), a sequence length of the demodulation reference signal is 8*20=160. If the demodulation reference signal is any demodulation reference signal shown in FIG. 3(b), a sequence length of the demodulation reference signal is 24*20=480.

For example, it is assumed that a quantity of resource units that carry a demodulation reference signal in full bandwidth is 20 (to be specific, N=20). Therefore, if the demodulation reference signal is any demodulation reference signal shown in FIG. 4(a), a sequence length of the demodulation reference signal is 12*20=240. If the demodulation reference signal is any demodulation reference signal shown in FIG. 4(b), a sequence length of the demodulation reference signal is 24*20=480.

S102. The transmit end device sends the demodulation reference signal, and the receive end device receives the demodulation reference signal.

For example, after performing operations such as resource mapping and inverse fast Fourier transform (IFFT) on the demodulation reference signal, the transmit end device sends the demodulation reference signal. The receive end device receives the signal and performs operations such as fast Fourier transform (FFT) and resource demapping on the signal, to obtain the demodulation reference signal. A processing process for uplink transmission may be different from a processing process for downlink transmission. In addition, the demodulation reference signal obtained by the receive end device may be understood as a signal obtained after the demodulation reference signal sent by the transmit end device is transmitted through a channel. Because the signal is affected by factors such as noise in a channel transmission process, the demodulation reference signal sent by the transmit end device is usually different from the demodulation reference signal obtained by the receive end device. The foregoing processing processes are clearly described in the prior art, and details are not described herein.

S103. The receive end device demodulates a data signal based on the demodulation reference signal.

A specific implementation process of S104 is not limited in this application. For example, reference may be made to the prior art.

In the method for transmitting the demodulation reference signal provided in this application, the sequence length of the demodulation reference signal is related to the attribute of the demodulation reference signal. The attribute of the demodulation reference signal includes at least one of the following: the pattern corresponding to the demodulation reference signal and the density of the demodulation reference signal. Therefore, the method for transmitting the demodulation reference signal is applicable to a scenario in which the density of the demodulation reference signal can be configured and/or the pattern corresponding to the demodulation reference signal can be configured, so that the method for transmitting the demodulation reference signal is applicable to a 5G communications system.

In some embodiments of this application, the sequence of the demodulation reference signal includes K same basic sequences, and each basic sequence is corresponding to one time-frequency resource that carries the demodulation reference signal, and K is an integer greater than or equal to 2. Optionally, each time-frequency resource includes one of the following: one or more symbols, one or more slots, one or more subframes, or the like in time domain. In addition, each time-frequency resource may also be one or more mini-slots in time domain.

For example, each time-frequency resource includes one symbol, and a resource unit is one RB pair. If the pattern corresponding to the demodulation reference signal is shown as FIG. 3(b), K=3. In this example, a symbol 2, a symbol 6, and a symbol 10 each carry one basic sequence, and the three basic sequences are the same. A length of the basic sequence is 8N, and as described above, N is the quantity of resource units that carry the demodulation reference signal in frequency domain. For example, each time-frequency resource includes two symbols. If the pattern corresponding to the demodulation reference signal is shown as FIG. 4(b), K=2. In this example, a symbol 2 and a symbol 3 carry one basic sequence, a symbol 8 and a symbol 9 carry one basic sequence, and the two basic sequences are the same. A length of the basic sequence is 12N, and as described above, N is the quantity of resource units that carry the demodulation reference signal in frequency domain.

For example, each time-frequency resource includes one subframe, and a resource unit is two RB pairs (to be specific, each RB pair in the resource unit occupy one subframe, and the two RB pairs in the resource unit occupy two different subframes). K=2. If a pattern corresponding to the demodulation reference signal on each RB pair is shown as FIG. 3(b), a length of one basic sequence is 24N, and N is the quantity of resource units that carry the demodulation reference signal in frequency domain. If a pattern corresponding to the demodulation reference signal on each RB pair is shown as FIG. 4(b), a length of one basic sequence is 24N, and N is the quantity of resource units that carry the demodulation reference signal in frequency domain.

For example, the modulation method is QPSK, a generation formula of the basic sequence may be as follows:

$$r(m) = \frac{1}{\sqrt{2}}(1-c(2m)) + j\frac{1}{\sqrt{2}}(1-2c(2m-1)), \quad \text{Formula 2}$$

$$m = 1, 2 \ldots (a*N)/K$$

For explanations of related content in Formula 2, refer to the foregoing explanations of Formula 1. Details are not described herein again.

It may be understood that, a length of the basic sequence is related to the time domain density and the frequency domain density of the demodulation reference signal. In this embodiment, once a time domain resource corresponding to the basic sequence is determined, the transmit end device knows the frequency domain density of the demodulation reference signal, and then generate the basic sequence. Therefore, an implementation is simple.

In some embodiments of this application, the method may further include: A base station sends indication information to the terminal, where the indication information is used to indicate the length of the basic sequence. The indication information may be semi-static configuration signaling such as radio resource control (RRC) signaling or medium access control (MAC) signaling, or may be dynamic indication signaling such as downlink control information (DCI). The indication information may include, for example, but is not limited to at least one of the following: the length of the basic sequence, a length index of the basic sequence, a value of N, and the like. It may be understood that because both the transmit end device and the receive end device can learn of the pattern corresponding to the demodulation reference signal and a quantity of resource units that carry any demodulation reference signal in the full bandwidth, after the base station indicates the value of N to the terminal, the terminal may learn of the basic sequence based on N and the pattern corresponding to the demodulation reference signal. This embodiment may be applied to an uplink transmission scenario, or may be applied to a downlink transmission scenario. In addition, this embodiment is described by using an example in which the base station indicates the length of the basic sequence to the terminal by using signaling. This application is not limited thereto. For example, the base station and the terminal may pre-agree, based on a protocol, on a length of a basic sequence corresponding to each pattern.

In some embodiments of this application, N time-frequency resources include one preamble resource and N-1 additional resources. The preamble resource may be understood as a time-frequency resource that carries the demodulation reference signal and that is a preamble symbol in time domain. The preamble symbol is a front symbol in a TI. The additional resource is a time-frequency resource that carries the demodulation reference signal other than the preamble resource. For example, the preamble symbol may be a symbol numbered 2 and/or a symbol numbered 3 in a subframe in an LTE system. A specific symbol or specific several symbols defined as the preamble symbol in a subframe is not limited in this application. The demodulation reference signal is usually carried in the preamble symbol. For example, the demodulation reference signal is set in the preamble symbol by default. However, this is not limited to a scenario in which a requirement for low latency transmission is not strong, a medium-and-high speed scenario, a Doppler frequency shift scenario, or the like. To improve precision of channel estimation, in some scenarios, for example, but not limited to a high-speed scenario, in addition to setting the demodulation reference signal in the preamble symbol, the demodulation reference signal may be further additionally carried in a non-preamble symbol in the TI. For example, in the pattern shown as FIG. 3(b), a quantity of preamble symbols is 1, and other two symbols that carry the demodulation reference signal are non-preamble symbols. In the pattern shown as FIG. 4(b), a quantity of preamble symbols is 2, and other two symbols that carry the demodulation reference signal are non-pre-symbols. It can be seen that the demodulation reference signal may be carried only on a preamble symbol, or may be carried on both a preamble symbol and a non-preamble symbol.

It may be understood that a process in which the transmit end device and/or the receive end device obtains a sequence of each demodulation reference signal may include: obtaining a basic sequence based on a generation formula of the basic sequence, and obtaining the sequence of the demodulation reference signal based on the basic sequence. In addition, procedures for obtaining sequences of different demodulation reference signals may be independent of each other. This application further provides another method for obtaining a basic sequence. Specifically, (a*N)/K values are selected from a first preset sequence to obtain the basic sequence. A length of the first preset sequence is a quantity of REs in a time-frequency resource. In an implementation, the time-frequency resource is a symbol occupied by the basic sequence in time domain, and is full bandwidth in frequency domain. In another implementation, the time-frequency resource is a symbol occupied by the basic sequence in time domain, and is a resource unit that can be used to transmit PDSCH information and that is allocated to the receive end device in full bandwidth in frequency domain.

Optionally, for each demodulation reference signal, a basic sequence of the demodulation reference signal may be obtained by selecting (a*N)/K values from the first preset sequence. In this way, the basic sequence corresponding to each demodulation reference signal does not need to be obtained based on a calculation formula (for example, Formula 2). Therefore, an implementation is simple. For example, each time-frequency resource is a symbol in time domain, and 20 RB pairs are included in the full bandwidth (each RB pair is a resource unit), a length of the first preset sequence is 12*20=240. Based on this, in the pattern shown in FIG. 3(b), a length of a basic sequence corresponding to a demodulation reference signal is (24*20)/3=160, where a=24, N=20, and K=3. Therefore, the basic sequence corresponding to the demodulation reference signal may be obtained by selecting 160 modulation symbols from 240 modulation symbols of the first preset sequence.

For example, the modulation method is QPSK, a generation formula of the first preset sequence may be as follows:

$$r(m) = \frac{1}{\sqrt{2}}(1 - c(2m)) + j\frac{1}{\sqrt{2}}(1 - 2c(2m - 1)),$$ Formula 3

$$m = 1, 2 \ldots b*X$$

Herein, X indicates a quantity of available resource units in the full bandwidth or a quantity of resource units that can be used to transmit PDSCH information in the full bandwidth. For example, assuming that the full bandwidth is 20 M (M), and the resource unit is an RB pair, a quantity of available RB pairs in the full bandwidth is 110, a quantity of RB pairs that can be used to transmit the PDSCH information may be 100, and a quantity of RB pairs that carry any demodulation reference signal in the full bandwidth is less than or equal to 100. Herein, b indicates a quantity of subcarriers in one resource unit. Assuming that the resource unit is one RB pair, b=12. For explanations of other content in Formula 3, refer to the foregoing explanations of Formula 1. Details are not described herein again.

How to select (a*N)/K values from the first preset sequence is not limited in this application. For example, selection is performed in a manner including but not limited to the following manners:

Manner 1: The (a*N)/K values are sequentially selected from the first preset sequence.

For example, based on the pattern shown in FIG. 3(b), the first 160 modulation symbols in the 240 modulation symbols may be used as the basic sequence corresponding to the demodulation reference signal.

Manner 2: The (a*N)/K values are selected from the first preset sequence based on an index of a scheduled resource unit.

For example, based on the pattern shown in FIG. 3(b), it is assumed that a resource unit is an RB pair, and a demodulation reference signal is carried on each RB pair in full bandwidth. Therefore, every 12 modulation symbols may be considered as one group based on a sequential order of modulation symbols in the first preset sequence, and eight modulation symbols are obtained in each group, to obtain 160 modulation symbols, and the 160 modulation symbols are used as a basic sequence corresponding to the demodulation reference signal. For another example, based on the pattern shown in FIG. 3(b), it is assumed that the base station schedules a demodulation reference signal on ten RB pairs: an RB pair 1 to an RB pair 5 and an RB pair 16 to an RB pair 20 in full bandwidth. Therefore, every 12 modulation symbols may be considered as one group based on a sequential order of modulation symbols in the first preset sequence, and eight modulation symbols are obtained in each group of a group 1 to a group 5 and a group 16 to a group 20, to obtain 80 modulation symbols. The 80 modulation symbols may be used as a basic sequence corresponding to the demodulation reference signal. Eight modulation symbols obtained in each group are not limited in this application.

Manner 3: The (a*N)/K values are selected from the first preset sequence based on a time-frequency resource location of a demodulation reference signal.

For example, based on the pattern shown in FIG. 3(b), it is assumed that a resource unit is an RB pair, and a demodulation reference signal is carried on each RB pair in full bandwidth. Therefore, every 12 modulation symbols may be considered as one group based on a sequential order of modulation symbols in the first preset sequence, and then modulation symbols numbered 0, 1, 3, 4, 6, 7, 9, and 10 in each group are obtained, to obtain 160 modulation symbols. The 160 modulation symbols may be used as a basic sequence corresponding to the demodulation reference signal on a port 0 or/and a port 1.

It should be noted that a specific manner in which the transmit end device and the receive end device obtain (a*N)/K values may be pre-agreed on by the receiving party and the sending party by using a protocol, or may be configured by the base station for the terminal through signaling. The configuration may be specifically semi-static configuration (for example, configuration is performed by using RRC signaling or MAC signaling) or dynamic indication configuration (for example, configuration is performed by using DCI). In addition, when no conflict occurs, some features in a plurality of embodiments provided in this application may be reassembled to form a new technical solution, which is not enumerated herein.

It may be understood that the foregoing description is performed by using an example in which K is greater than or equal to 2. This embodiment is also applicable to a scenario in which K=1. In this case, a basic sequence is a sequence of a demodulation reference signal.

In some embodiments of this application, in an uplink transmission scenario and/or a downlink transmission scenario, the base station may configure a sequence length of a demodulation reference signal for the terminal through signaling. Optionally, the base station sends indication information to the terminal. The indication information is used to indicate a multiple between the sequence length of the demodulation reference signal and a length of a second preset sequence. Correspondingly, the terminal receives the indication information, and determines the sequence length of the demodulation reference signal based on the indication information. The length of the second preset sequence may be, for example, but is not limited to a maximum value or a minimum value of lengths of all sequences supported by a system. For example, the system supports two patterns shown in FIG. 3. In this way, if a quantity of RB pairs that carry a demodulation reference signal in full bandwidth is 20, the lengths of the sequences supported by the system are 20*8=160 and 20*24=480. In this case, the length of the second preset sequence may be set to 160, or may be set to 480. If the second preset sequence is 160, when a pattern corresponding to the demodulation reference signal is shown as FIG. 3(a), the multiple is 1; and when the pattern corresponding to the demodulation reference signal is shown as FIG. 3(b), the multiple is 3. If the length of the second preset sequence is 480, when a pattern corresponding to the demodulation reference signal is shown as FIG. 3(a), the multiple is ⅓; and when the pattern corresponding to the demodulation reference signal is shown as FIG. 3(b), the multiple is 1.

The solutions provided in the embodiments of this application are described above mainly from perspectives of network elements. It may be understood that, to implement the foregoing functions, each network element, for example, the base station or the terminal, may include a corresponding hardware structure and/or software module for performing each function. A person of ordinary skill in the art should easily be aware that, in combination with the examples described in the embodiments disclosed in this specification, units and algorithms steps can be implemented by hardware or a combination of hardware and computer software in this application. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

In the embodiments of this application, function modules of the base station or the terminal may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example, and is merely a logical function division. In actual implementation, there may be another division manner. The following performs description by using an example in which each function module is obtained through division based on each corresponding function.

Figure 5:
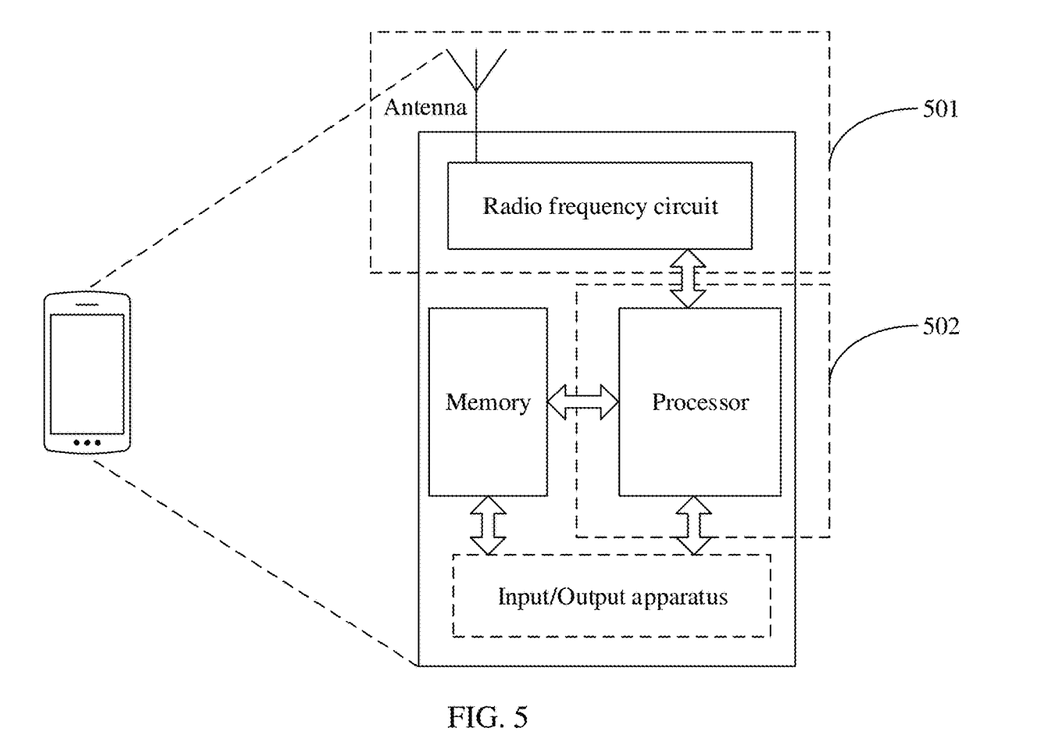
FIG. 5 is a schematic structural diagram of an apparatus for transmitting a demodulation reference signal according to an embodiment of this application.

An embodiment of this application further provides an apparatus for transmitting a demodulation reference signal, and the apparatus may be a chip (for example, a baseband chip or a communications chip), or may be a terminal. The apparatus may be configured to perform any step in FIG. 2. The following performs description by using an example in which the apparatus is a terminal. FIG. 5 is a simplified schematic structural diagram of a terminal. For ease of understanding and convenience of figure illustration, an example in which the terminal is a mobile phone is used in FIG. 5. As shown in FIG. 5, the terminal includes a processor, a memory, a radio frequency circuit, an antenna, and an input/output apparatus. The processor is mainly configured to: process a communications protocol and communication data, and control the terminal to execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user. It should be noted that some types of terminals may not have an input/output apparatus.

When the processor needs to send data, the processor performs baseband processing on the to-be-sent data, and outputs the baseband signal to the radio frequency circuit. After performing radio frequency processing on the baseband signal, the radio frequency circuit sends the radio frequency signal in an electromagnetic wave form by using the antenna. When data is sent to the terminal, the radio frequency circuit receives the radio frequency signal by using the antenna, converts the radio frequency signal into the baseband signal, and outputs the baseband signal to the processor. The processor converts the baseband signal into data, and processes the data. For ease of description, FIG. 5 shows only one memory and one processor. In an actual terminal product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna having receiving and sending functions and the radio frequency circuit may be considered as a transceiver unit of the terminal, and the processor having a processing function may be considered as a processing unit of the terminal. As shown in FIG. 5, the terminal includes a transceiver unit 501 and a processing unit 502. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 501 and that is configured to implement a receiving function may be considered as a receiving unit, and a component that is in the transceiver unit 501 and that is configured to implement a sending function may be considered as a sending unit. In other words, the transceiver unit 501 includes the receiving unit and the sending unit. The transceiver unit sometimes may also be referred to as a transceiver, a transceiver, a transceiver circuit, or the like. The receiving unit sometimes may also be referred to as a receiver, a receiver, a receiver circuit, or the like. The sending unit sometimes may also be referred to as a transmitter, a transmitter, a transmitter circuit, or the like.

For example, in an uplink transmission scenario, a transmit end device may be the terminal. In an implementation, the processing unit 502 is configured to perform S101 in FIG. 2 and/or another step in this application. The transceiver unit 501 is configured to perform the step performed by the transmit end device in S102 in FIG. 2 and/or another step in this application.

For example, in a downlink transmission scenario, a receive end device may be the terminal. In an implementation, the processing unit 502 is configured to perform S103 in FIG. 2 and/or another step in this application. The transceiver unit 501 is configured to perform the step performed by the receive end device in S102 in FIG. 2 and/or another step in this application.

Figure 6:
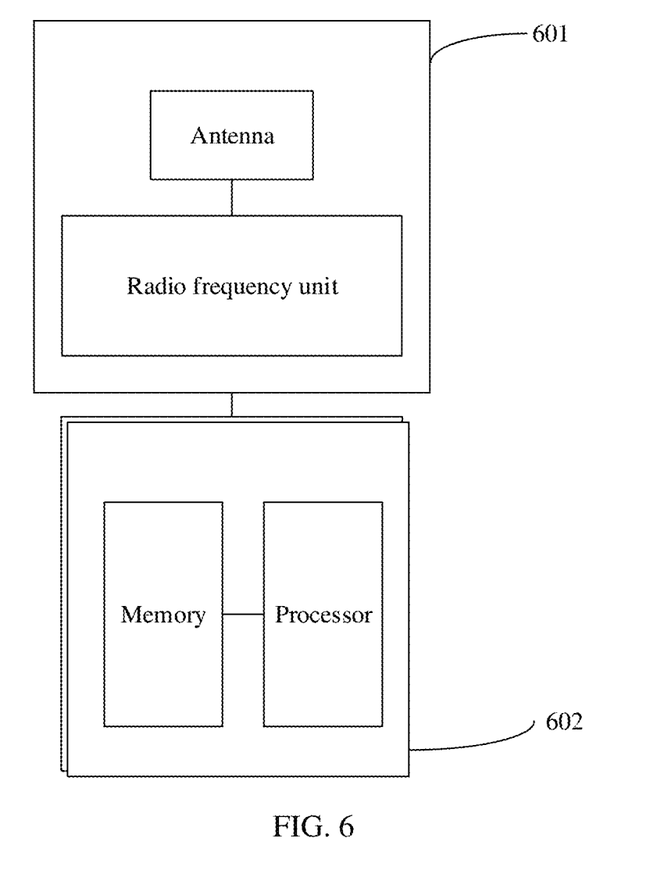
FIG. 6 is a schematic structural diagram of another apparatus for transmitting a demodulation reference signal according to an embodiment of this application.

An embodiment of this application further provides an apparatus for transmitting a demodulation reference signal, and the apparatus may be a chip (for example, a baseband chip or a communications chip), or may be a base station. The apparatus may be configured to perform any step in FIG. 2. The following performs description by using an example in which the apparatus is a base station. FIG. 6 is a simplified schematic structural diagram of a base station. The base station includes a part 601 and a part 602. The part 601 is mainly configured to: receive and send a radio frequency signal, and perform conversion between the radio frequency signal and the baseband signal. The part 602 is mainly configured to: perform baseband processing, control the base station, and the like. The part 61 may be usually referred to as a transceiver unit, a transceiver, a transceiver circuit, a transceiver, or the like. The part 602 is usually a control center of the base station, and may be usually referred to as a processing unit that is configured to control the base station to perform any step in FIG. 3. For details, refer to the foregoing descriptions of related pails.

The transceiver unit of the part 601 may also be referred to as a transceiver, a transceiver, or the like. The transceiver unit includes an antenna and a radio frequency unit, and the radio frequency unit is mainly configured to perform radio frequency processing. Optionally, a component that is in the part 601 and that is configured to implement a receiving function may be considered as a receiving unit, and a component that is configured to implement a sending function may be considered as a sending unit. In other words, the part 601 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 602 may include one or more boards. Each board may include one or more processors and one or more memories. The processor is configured to read and execute a program in the memory, to implement a baseband processing function and control the base station. If there are a plurality of boards, the boards may be interconnected to enhance a processing capability. In an optional implementation, the plurality of boards may share one or more processors, or the plurality of boards share one or more memories, or the plurality of boards share one or more processors at the same time.

For example, in an uplink transmission scenario, a receive end device may be the base station. In an implementation, the processing unit is configured to perform $Sio_3$ in FIG. 2 and/or another step in this application. The transceiver unit is configured to perform the step performed by the receive end device in S102 in FIG. 2 and/or another step in this application.

For example, in a downlink transmission scenario, a transmit end device may be the base station. In an implementation, the processing unit is configured to perform S101 in FIG. 2 and/or another step in this application. The transceiver unit is configured to perform the step performed by the transmit end device in S102 in FIG. 2 and/or another step in this application.

For explanations and beneficial effects of related content in any apparatus provided above, refer to the corresponding method embodiments provided above. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another other variations of the disclosed embodiments by viewing the accompanying drawings, disclosed content, and the accompanying claims. In the claims, the word "comprising" does not exclude another component or another step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and the accompanying drawings are merely examples for description of this application defined by the claims, and are intended to cover any of or all modifications, variations, combinations, or equivalents within the scope of this application. Obviously, a person skilled in the art can make various modifications and variations to this application without departing from the spirit and scope of this application. In this way, this application is intended to cover these modifications and variations of this application provided that they fall within the scope of protection defined by the following claims and their equivalent technologies of this application.

What is claimed is:

1. A method, comprising:
    generating, by a transmit end device, a demodulation reference signal, wherein a sequence length of the demodulation reference signal is related to an attribute of the demodulation reference signal, and wherein a sequence of the demodulation reference signal comprises K same basic sequences, each basic sequence of the K same basic sequences corresponds to one respective time-frequency resource that carries the demodulation reference signal, and K is an integer greater than or equal to 2; and
    sending, by the transmit end device, the demodulation reference signal.

2. The method according to claim 1, wherein the attribute of the demodulation reference signal comprises:
    a pattern corresponding to the demodulation reference signal; or
    density of the demodulation reference signal.

3. The method according to claim 1, wherein each time-frequency resource corresponding to the K same basic sequences comprises:
    one or more symbols;
    one or more slots; or
    one or more subframes.

4. The method according to claim 1, wherein K time-frequency resources corresponding to the K same basic sequences comprise one respective preamble resource and Ki respective additional resources.

5. The method according to claim 1, further comprising:
    sending indication information, wherein the indication information indicates a length of each of the K same basic sequences.

6. The method according to claim 1, further comprising:
    receiving indication information, wherein the indication information indicates a length of each of the K same basic sequences.

7. A method, comprising:
    receiving, by a receive end device, a demodulation reference signal, wherein a sequence length of the demodulation reference signal is related to an attribute of the demodulation reference signal, wherein a sequence of the demodulation reference signal comprises K same basic sequences, each basic sequence of the K same basic sequences corresponds to one respective time-frequency resource that carries the demodulation reference signal, and K is an integer greater than or equal to 2; and
    demodulating, by the receive end device, a data signal based on the demodulation reference signal.

8. The method according to claim 7, wherein the attribute of the demodulation reference signal comprises:
    a pattern corresponding to the demodulation reference signal; or
    density of the demodulation reference signal.

9. The method according to claim 7, wherein each time-frequency resource corresponding to the K same basic sequences comprises:
    one or more symbols;
    one or more slots; or
    one or more subframes.

10. The method according to claim 7, wherein K time-frequency resources corresponding to the K same basic sequences comprise one respective preamble resource and Ki respective additional resources.

11. The method according to claim 7, further comprising:
    sending indication information, wherein the indication information indicates a length of each basic sequence of the K same basic sequences.

12. The method according to claim 7, further comprising:
    receiving indication information, wherein the indication information indicates a length of each basic sequence of the K same basic sequences.

13. An apparatus, comprising:
    a processor;
    a non-transitory computer-readable storage medium storing a program to be executed by the processor, the program including instructions for:
        generating a demodulation reference signal, wherein a sequence length of the demodulation reference signal is related to an attribute of the demodulation reference signal, wherein a sequence of the demodulation reference signal comprises K same basic sequences, each basic sequence of the K same basic sequences corresponds to one respective time-frequency resource that carries the demodulation reference signal, and K is an integer greater than or equal to 2; and
    a transceiver, configured to send the demodulation reference signal.

14. The apparatus according to claim 13, wherein the attribute of the demodulation reference signal comprises:
    a pattern corresponding to the demodulation reference signal; or
    density of the demodulation reference signal.

15. The apparatus according to claim 13, wherein each time-frequency resource corresponding to the K same basic sequences comprises:
    one or more symbols;
    one or more slots; or
    one or more subframes.

16. The apparatus according to claim 13, wherein K time-frequency resources corresponding to the K same basic sequences comprise one respective preamble resource and K-1 respective additional resources.

17. The apparatus according to claim 13, wherein the transceiver is further configured to:
    send or receive indication information, wherein the indication information indicates a length of each basic sequence of the K same basic sequences.

* * * * *

UNITED STATES PATENT AND TRADEMARK OFFICE
CERTIFICATE OF CORRECTION

PATENT NO. : 11,165,606 B2  
APPLICATION NO. : 16/676906  
DATED : November 2, 2021  
INVENTOR(S) : Yong Liu Page 1 of 1

It is certified that error appears in the above-identified patent and that said Letters Patent is hereby corrected as shown below:

In the Claims

Claim 4, Column 17; Line 30; delete "Ki" insert --K-1--

Claim 10, Column 18; Line 10; delete "Ki" insert --K-1--

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*